United States Patent
Shankar et al.

(10) Patent No.: US 8,233,492 B1
(45) Date of Patent: Jul. 31, 2012

(54) VOICE GATEWAY FAILURE DECODER

(75) Inventors: Jagannathan Shiva Shankar, Bangalore (IN); Jayathirtha C. Shivaram, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 770 days.

(21) Appl. No.: 11/692,149

(22) Filed: Mar. 27, 2007

(51) Int. Cl.
*H04L 12/54* (2006.01)

(52) U.S. Cl. .................... 370/401; 370/352; 370/328

(58) Field of Classification Search .................. 370/401, 370/356, 352
See application file for complete search history.

(56) References Cited

U.S. PATENT DOCUMENTS

| | | | |
|---|---|---|---|
| 6,453,028 B1 * | 9/2002 | Ganesh ..................... | 379/112.04 |
| 6,707,811 B2 * | 3/2004 | Greenberg et al. ........... | 370/352 |
| 6,895,002 B2 * | 5/2005 | Shah et al. .................... | 370/356 |
| 6,912,216 B1 * | 6/2005 | Smith et al. .................... | 370/352 |
| 7,286,650 B2 * | 10/2007 | Pantana et al. ............. | 379/88.13 |
| 7,613,170 B1 * | 11/2009 | Grabelsky et al. ............. | 370/352 |
| 2004/0032862 A1 * | 2/2004 | Schoeneberger et al. ...... | 370/352 |
| 2004/0042469 A1 * | 3/2004 | Clark et al. .................... | 370/401 |
| 2006/0160575 A1 * | 7/2006 | Laghrari ....................... | 455/563 |
| 2006/0221886 A1 * | 10/2006 | Rao ................................ | 370/328 |
| 2008/0043976 A1 * | 2/2008 | Maximo et al. ........... | 379/220.01 |

* cited by examiner

*Primary Examiner* — Dang Ton
*Assistant Examiner* — Pamit Kaur
(74) *Attorney, Agent, or Firm* — Stolowitz Ford Cowger LLP

(57) ABSTRACT

An apparatus including an operation manager for an Internet Protocol (IP) telephony system. The operation manager is configured to identify a gateway which is associated with a system fault, and determine an impact of the system fault on the IP telephony system, or on an external network that is interfaced to the IP telephony system by the gateway. The impact of the system fault may be determined according to a dial pattern associated with a call routed to the gateway.

18 Claims, 4 Drawing Sheets

FIG. 3
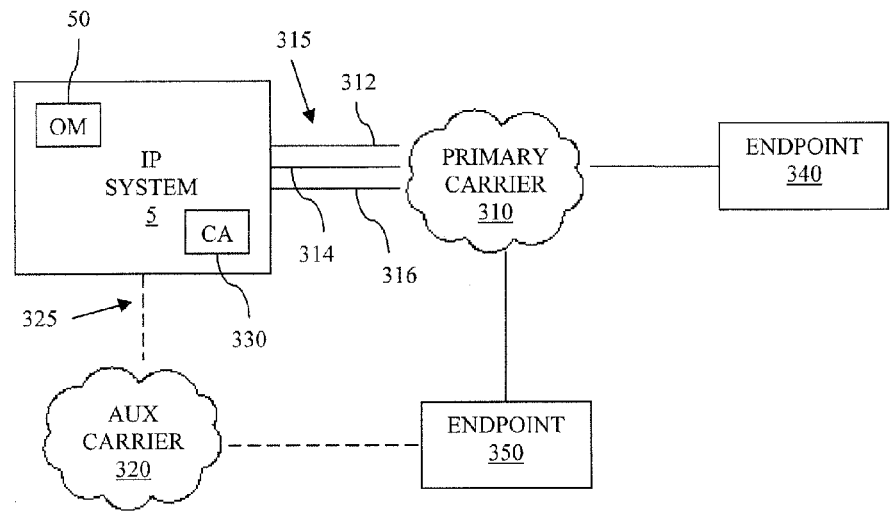
FIG. 4
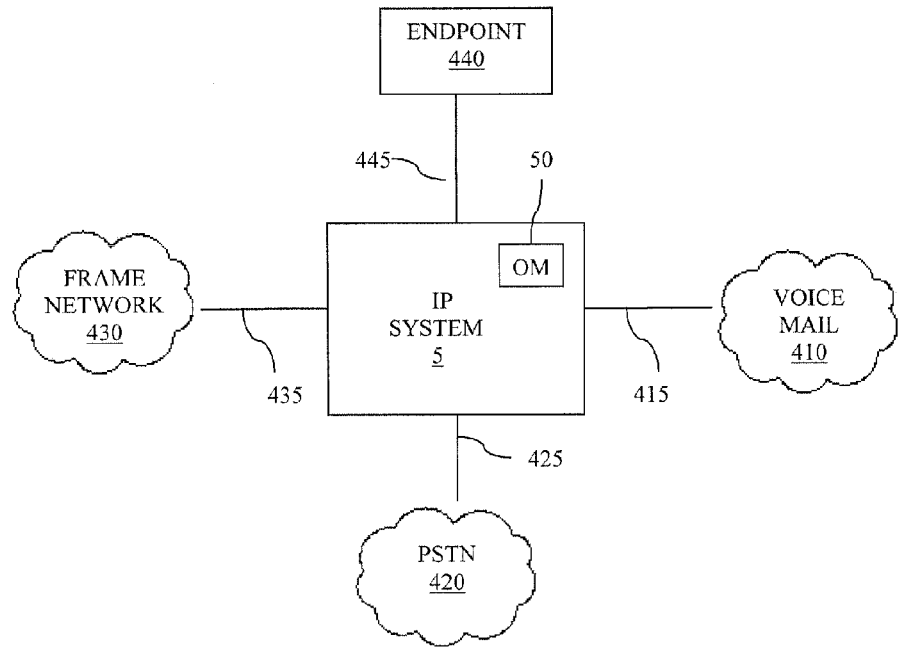
FIG. 5

| FAULT 610 | DIAL PATTERNS 620 | DESCRIPTION 630 |

US 8,233,492 B1

VOICE GATEWAY FAILURE DECODER

TECHNICAL FIELD

The invention relates to determining the impact of voice gateway failures in an Internet Protocol (IP) telephony environment.

BACKGROUND

Distributed IP telephony systems include interfaces to external systems, such as voice-mail, public switched networks or frame relay networks. The interface is typically a voice gateway. The voice gateway provides services such as voice over IP (VoIP) telephony and Internet access. The gateway controls multiple networks and isolates voice and data traffic. The gateway further controls the number of calls being made on the IP telephony system as well as an available data bandwidth. The voice gateway is configured to allow users to make telephone calls over an Internet connection, where the voice data is transmitted as VoIP packets.

Conventional IP telephony systems provide fault detection services when a gateway or interface goes down, or is otherwise inoperable. The fault detection services provide generic error messages. A system administrator is required to test and analyze multiple devices and configurations to troubleshoot the error.

The present invention addresses these and other problems associated with the prior art.

BRIEF DESCRIPTION OF THE DRAWINGS

FIG. 3 illustrates an example block diagram of the IP system of FIG. 1 connected to a primary carrier and an auxiliary carrier.

FIG. 4 illustrates an example block diagram of the IP system of FIG. 1 connected to multiple gateways and services.

FIG. 5 illustrates an example block diagram of an alternate embodiment of an IP system.

DESCRIPTION OF EXAMPLE EMBODIMENTS

Overview

An apparatus is herein disclosed as including an operation manager for an Internet Protocol (IP) telephony system. The operation manager is configured to identify a gateway which is associated with a system fault, and determine an impact of the system fault on the IP telephony system, or on an external network that is interfaced to the IP telephony system by the gateway. The impact of the system fault may be determined according to a dial pattern associated with a call routed to the gateway.

A system is herein disclosed as including a gateway for an Internet Protocol (IP) telephony system and a call agent which determines a route pattern to one or more destinations according to a dial pattern associated with a call. The system further includes an operation manager which calculates an impact of a system fault by identifying the one or more destinations serviced by the gateway and associated with the dial pattern.

A method is herein disclosed as including detecting a failure in an Internet Protocol telephony system and identifying a gateway that is associated with the fault. The method further includes identifying one or more dial patterns associated with the gateway, and analyzing the dial patterns to determine an effect of the failure.

The invention will become more readily apparent from the following detailed description of a preferred embodiment of the invention which proceeds with reference to the accompanying drawings.

DETAILED DESCRIPTION

Systems which manage or monitor enterprise level network connections are able to analyze failure of physical connections, such as where a switch is a root cause of the failure, and a phone going down or being inoperable is an impact or result of the failure. In voice over Internet Protocol (VoIP) systems and applications, in addition to the physical connections, dependencies between dial patterns, logical connections and resources may be evaluated by an improved operations manager as disclosed herein, in order to determine a true end-user impact.

When a gateway in an Internet Protocol (IP) system goes down, services provided to users of the IP system may be interrupted or provided at a reduced capacity. Timely notification can alert a system administrator of the system fault so that the fault may be corrected or otherwise accounted for. An improved notification that includes an impact of the system fault allows the system administrator to better understand the immediate consequences of interrupted services and impacted users. This improved notification also results in a more expedient solution to the fault to be implemented.

Figure 1:
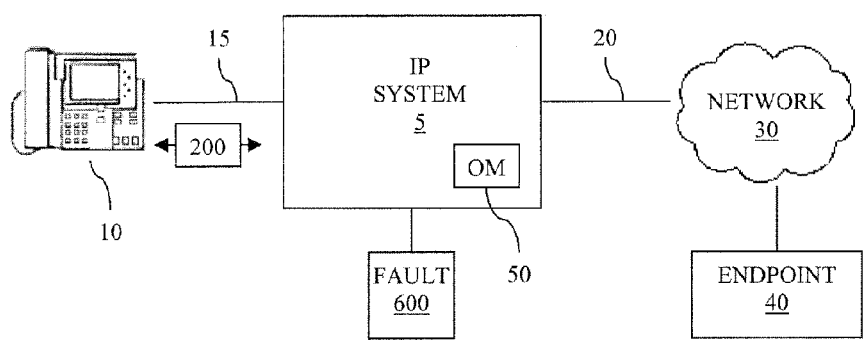
FIG. 1 illustrates an example block diagram of a simplified Internet Protocol (IP) system including a gateway.

FIG. 1 illustrates an example block diagram of a simplified IP system 5 including a gateway or gateway port 20. Gateway 20 may be a voice gateway. The IP system 5 may provide VoIP services. The IP system 5 is shown as including an operation manager 50. The operation manager 50 may include one or more modules residing on one or more processors, and may be configured to manage system operations. The system operations may include system calls that are transmitted between a user of the IP system 5, such as user 10, and a destination or endpoint, such as endpoint 40, that may be remotely located to the IP system 5. Endpoint 40 may be included in or connected to a network, such as network 30, which is interfaced with the IP system 5.

Gateway 20 functions as the interface between network 30 and the IP system 5. The IP system 5 may be included in a network that has a different operating protocol, for example, than that of the network 30. Operation manager 50 may manage data flow through the gateway 20, both to and from the IP system 5.

In one embodiment, the user 10 in FIG. 1 is an IP phone such as a digital phone. User 10 is shown connected to the IP system 5 using a line 15. Line 15 may include a phone line, coaxial cable, fiber optics line, wireless communication, or any other means known in the art for transmitting data in an IP system or network. In one embodiment, endpoint 40 in FIG. 1 is an IP phone or an analog phone of a customer. Either or both endpoint 40 and user 10 may alternatively be a host computer, cell phone, fax machine, personal digital assistant, or any other device used to transmit data such as voice data.

Figure 2:
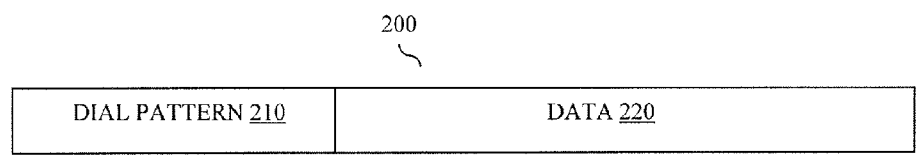
FIG. 2 illustrates an example block diagram of a call that may be made on the IP system of FIG. 1.

FIG. 2 illustrates an example block diagram of a call 200 that may be made on an IP system such as IP system 5 of FIG.

1. Call 200 may be initiated by the user 10 of the IP system, or may instead be initiated by a user or endpoint outside of the IP system 5, such as endpoint 40 of FIG. 1. For example, the call 200 may be made by and between the user 10 and the endpoint 40.

The call 200 may be an IP call that includes one or more data packets. The call 200 may include a field that identifies a route pattern or dial pattern 210 of the call 200. The dial pattern 210 may be used to select a route list associated with a destination according to numbers included in the dial pattern. For example, the first or last numbers provided in the dial pattern 210 may identify the destination of the call 200, and the route list may identify the gateway or router by which the call is transmitted. The call 200 may include data 220 that is being transmitted through the gateway 20 of FIG. 1. The data 220 may include voice data that is being transmitted by or between one or more IP phones. In one embodiment, call 200 is a VoIP data packet.

FIG. 3 illustrates an example block diagram of the IP System 5 of FIG. 1 connected to a primary carrier 310. In one embodiment a call, such as call 200 of FIG. 2, is transmitted from or to the IP system 5 and is carried by the primary carrier 310 from or to an endpoint, such as endpoint 340 or endpoint 350. The primary carrier 310 is shown connected to the IP system 5 by three gateways 312, 314 and 316. The three gateways 312, 314, 316 may be considered a trunk 315. A trunk, such as trunk 315, may include any number of gateways bundled together as multiple lines from a single carrier.

The gateways 312, 314, 316 may be physically bundled together in a common housing, or logically bundled together and managed by the operation manager 50. Data traffic and routing over the trunks and gateways may be controlled by a central call controller or call agent 330 associated with the IP system 5. Call agent 330 may follow the H.323 protocol as defined by the International Telecommunications Union Telecommunication Sector (ITU-T) version 3. Call agent 330 may also follow the Media Gateway Control Protocol (MGCP), or any other relevant protocol known in the art. The gateways 312, 314, 316 in the trunk 315 may each be used as an interface between the IP system 5 and the primary carrier 310, where each of the gateways 312, 314, 316 are included as an entry in an ordered list. In one embodiment, the first gateway on the list that includes a free voice channel is used to transmit a call, such as call 200 of FIG. 2. One gateway may be used to control multiple destinations, including geographically separate endpoints.

The IP system 5 may also be connected to an auxiliary carrier, such as auxiliary carrier 320. The auxiliary carrier 320 is shown connected to the IP system 5 by a trunk or a gateway 325. The auxiliary carrier 320 may serve as a backup carrier to the primary carrier 310 in the event of a system fault or overcapacity of the free channels associated with gateways 312, 314, 316. In one embodiment, the auxiliary carrier 320 has less capacity or has a higher data transfer cost than the primary carrier 310, such that the call agent 330 preferentially selects gateways 312, 314, 316 for transmitting a call, such as call 200, rather than gateway 325. Trunk or gateway 325 may provide redundant or backup capacity for trunk 315.

Trunk 315 may be bundled together with trunk 325, either physically or logically. Two or more trunks may be referred to as a trunk group when bundled together. In FIG. 3, a trunk group including trunks 315 and 325 are shown connecting endpoint 350 to the IP system 5 via the primary carrier 310 and secondary carrier 320. The endpoint 340 is shown as being connected to the IP system 5 by trunk 315 via the primary carrier 310. One or more of the gateways 312, 314, 316 may be configured to transmit data to endpoints 340 and 350 via the primary carrier 310.

FIG. 4 illustrates an example block diagram of the IP System 5 of FIG. 1 connected to multiple gateways and services. Gateway or gateway port 415 is shown connecting the IP system 5 to a network 410 including voice mail services. Gateway or gateway port 425 is shown connecting the IP system 5 to a network 420 providing access to a public switched telephone network (PSTN) and the services provided therein. Gateway or gateway port 435 is shown connecting the IP system 5 to a frame network 430. In one embodiment, gateways 415, 425, 435 are provided as trunks or trunk groups, including multiple gateways.

An endpoint 440 is shown connected to the IP system 5 by line 445. In one embodiment, endpoint 440 has access to the IP system 5 without requiring an interface or gateway there between. In another embodiment, endpoint 440 is a user of the IP system 5 that communicates with endpoints associated with networks 410, 420, 430.

A gateway, or gateway port, is typically provided in two configurations for VoIP telephony applications. For example, a single gateway interfacing two networks may be provided as a stand-alone gateway. Gateway 20 in FIG. 1 could therefore be identified as a stand-alone gateway. A gateway may also be included as part of a trunk, for example the gateways 312, 314, 316 included in trunk 315 of FIG. 3.

When a system fault is detected in an IP telephony system, such as IP system 5, the operation manager 50 may identify which gateway is associated with the fault. The gateway may identify itself as being the source of the fault, or the gateway may be identified according to a data transfer over the gateway that failed to reach its destination, for example. The gateway itself may not be the source of the system fault.

The operation manager 50 is able to determine an impact of the system fault on the IP system 5 or on an external network, such as networks 410, 420, 430 of FIG. 4, which is interfaced to the IP system 5 by the identified gateway. The operation manager 50 is able to determine the impact according to a dial pattern, such as dial pattern 210 of FIG. 2, associated with a call routed to the identified gateway.

FIG. 5 illustrates an example block diagram of an alternate embodiment of an IP system 500, including an operation manager 510, an operation manager inventory 520, a call agent 530 and a time of day (TOD) device 540. The IP system 500 may function in place of, or in addition to, IP system 5 identified in FIGS. 1, 3 and 4. Operation manager 510 is configured to manage data communication, including voice data such as call 200 of FIG. 2, transferred by and between the IP system 500 and one or more networks that are interfaced with the IP system 500. Operation manager 510 is able to determine an impact of a system fault on the IP system 500 or on an external network. The operation manager 510 may detect a problem that occurs between a gateway and a call agent, and generate an IP system fault message 600.

In one embodiment, the impact of a system fault is determined according to a number of destination endpoints or a number of dial patterns associated with a gateway that has been identified as a result of the system fault. Once the gateway has been identified, the number of dial patterns that utilize the gateway may be determined.

In another embodiment, the impact of a system fault is determined according to a number of gateways included in a trunk. The operation manager inventory 520 is part of a monitoring system that may be used to store or collect information on gateways and trunks that interface with the IP system 500. For example, the operation manager inventory 520 may provide information on the number of gateways included in a particular trunk, or on the number of trunks or trunk groups that the gateway is a part of. In one embodiment, this information is collected at the time the system fault is discovered, where the operation manager inventory 520 dynamically monitors the associations between gateways and trunks.

Figure 6:
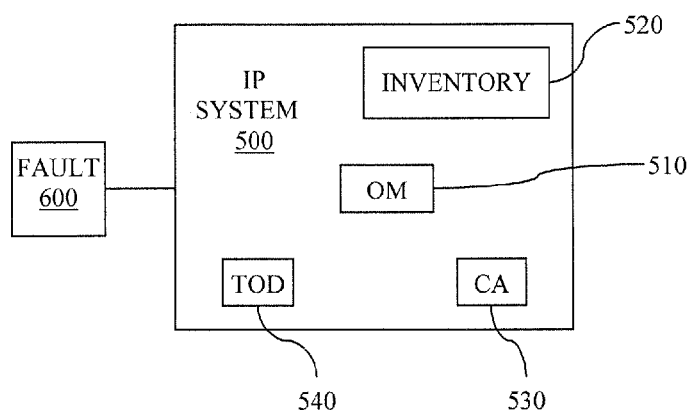
FIG. 6 illustrates an example block diagram of an IP system fault message.

FIG. 6 illustrates an example block diagram of an IP system fault message 600 that may be generated by the operation manager 50 or 510. The IP system fault message 600 is shown as including a fault type 610, one or more dial patterns 620, and a field for a description 630 of the fault impact. The IP system fault message 600 may be provided to a system administrator or user of the IP system 5 or 500 of FIG. 1 and FIGS. 3-5.

The fault type 610 may include a code or identification of the type of system fault that has occurred. For example, the fault type 610 may indicate that a gateway has failed, that a message or voice call was interrupted, or that system performance has been diminished. The dial patterns 620 included in the IP system fault message 600 may be provided so as to identify one or more dial patterns that are associated with the system fault identified in fault type 610. The dial patterns 620 may be used to identify endpoints, gateways, trunks, or trunk groups that are associated with, or impacted by, the system fault.

In one embodiment, the description field 630 provides an intuitive description of the endpoints that are affected by the system fault associated with the identified dial patterns 620. For example, a dial pattern 620 including a number or code may be accompanied by a description 630 that provides a geographic location, branch, department, or building associated with the affected endpoints. This may provide for a more efficient and convenient manner for a system administrator to effectively resolve the system fault. Intuitive descriptions of the endpoints may be maintained in a database or lookup table, for example.

In one embodiment, the impact of the system fault is determined according to an identification of a service associated with the identified gateway. For example with reference to FIG. 4, gateways 415, 425 and 435 are associated with services related to voice mail, PSTN and frame networks. Each of these services may be analyzed according to criteria including a number of gateways interfacing the services, a number of endpoints utilizing the services, a necessity of the services, or the nature of the services. The impact of a temporary interruption of one service may not be viewed to be as great as the temporary interruption of another service. In one embodiment, the interruption of the storage or retrieval of data in a voice mail network 410 may be rated as having a lower impact criterion than that of an interruption of services related to contemporaneous voice data transmission over the PSTN network 420. The impact criteria may be customized to any IP system.

The call agent 530 of FIG. 5 may be used to determine a route pattern for one or more destinations according to a dial pattern 210 associated with the call 200 of FIG. 2. A route pattern is the criteria or policy based on which call 200 may be routed to specific gateways or trunks. The destinations may include endpoints, such as endpoints 340, 350 in FIG. 3. In one embodiment, the destination includes any of the voice mail system 410, the PSTN network 420, or the frame relay network 430 identified in FIG. 4. The operation manager 510 calculates an impact of a system fault by identifying the one or more destinations serviced by a gateway and associated with the dial pattern 210. The rules by which the call agent 530 operates may be used to determine which route or gateways are associated with the failure. The failure and associated data may therefore be correlated with the call agent configuration data.

In one embodiment a time of day is determined by the TOD device 540 in FIG. 5. The TOD device 540 may determine the time of day when a system fault occurs. The operation manager 510 may calculate or determine the impact of the system fault according to the identified time of day. For example, a system fault that occurs during peak data traffic (e.g. during normal business hours) may be treated has having a greater impact than a system fault that occurs during a time of day when the traffic load is less heavy (e.g. during evenings or on weekends). The operation manager 510 may be able to gauge the level of the traffic load according to the time of day rather than directly measuring the contemporaneous traffic that exists at the time of the system fault. The level of traffic during a certain window of time or at a specific time of day may be determined by looking at a trunk or gateway utilization history, for example.

Figure 7:
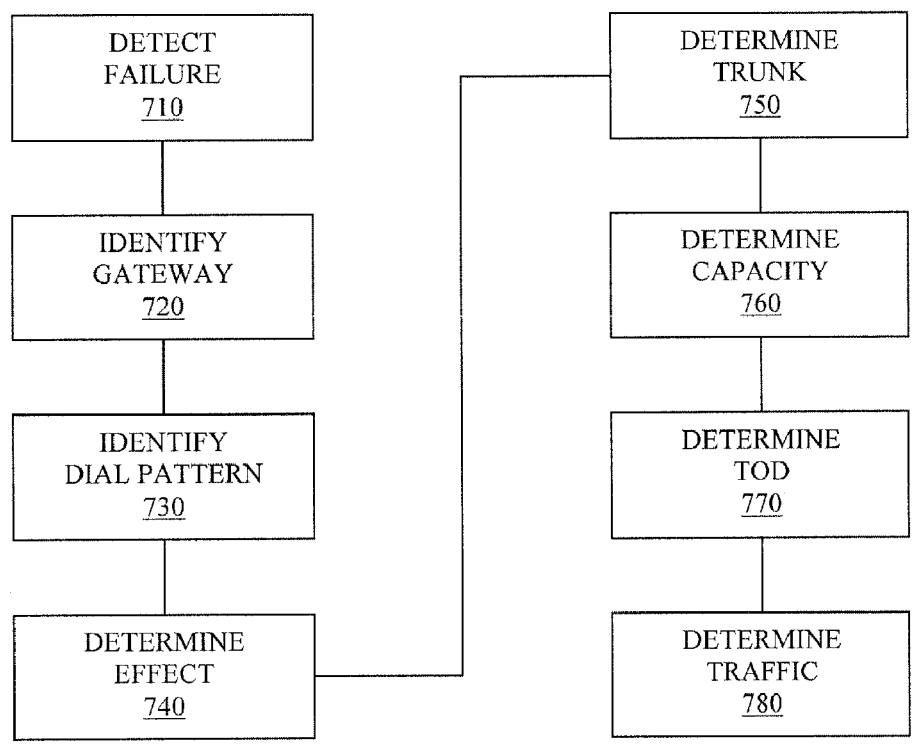
FIG. 7 illustrates an example operation of determining an IP system fault.

FIG. 7 illustrates an example operation of determining an IP system fault, making reference to the example apparatus and systems illustrated in FIGS. 1 to 6. At operation 710, a failure in an Internet Protocol telephony system, such as IP system 5, is detected. The failure may include a failed gateway, an interrupted voice call, an interrupted data transmission, interrupted services, data transfer delay, or over-capacity data traffic conditions for example. In one embodiment, some or all of the operations are performed or managed by an operation manager such as operation manager 5 or 510 of FIG. 1 and FIGS. 3-5.

At operation 720, a gateway is identified that is associated with the failure. The failure may identify a failed gateway. The gateway itself may indicate that it has failed. In some cases the gateway has not failed, and the failure is associated with a service or data that is being transferred over the identified gateway.

At operation 730, one or more dial patterns are identified as being associated with the gateway. A user such as user 10 in FIG. 1 may use a dial pattern, such as dial pattern 210 of FIG. 2, to send data to endpoint 40. Endpoint 40 of FIG. 1 is shown connected to network 30, where network 30 is interfaced to the IP system 5 by gateway 20. Gateway 20 may therefore be associated with the dial pattern 210.

At operation 740, the one or more dial patterns, such as dial pattern 210 of FIG. 2, are analyzed to determine an effect of the failure. The effect or impact of the failure may be determined by analyzing the number of endpoints associated with the dial pattern 210 or the types of services associated with the dial pattern.

At operation 750, it is determined whether or not the gateway is part of a trunk. In one embodiment, the effect or impact of the fault may be determined according to whether or not a gateway identified with the dial pattern 210 is part of a trunk or trunks including redundant or auxiliary gateways.

The trunks or trunk groups that the gateway is included in may be determined according to an inventory provided by an operation manager. For example, this information may be retained or collected in the operation manager inventory 520 of FIG. 5. Multiple dial patterns may be associated with the trunks or trunk groups that are identified by the operation manager, such as operation manager 510. These multiple dial patterns may be in addition to the dial pattern 210 that is associated with the gateway identified at operation 720.

In one embodiment, a gateway that is identified when a failure is detected is evaluated to determine if the gateway is a stand-alone gateway or part of a trunk. If the identified gateway is a stand-alone gateway, an operation may be performed whereby outbound and inbound dial peers are identified according to a stored dial peer configuration associated with the identified gateway. An impact of the failure may be evaluated or calculated according to the identity of the inbound or outbound dial peers or as to which networks or services the dial peers belong.

At operation 760, the effect or impact of the failure is evaluated as a measure of system capacity according to a number of gateways included in the trunk identified at operation 750. Multiple gateways, for example gateways 312, 314, 316 included in trunk 315 of FIG. 3 may be capable of handling a larger system capacity or data traffic than a single gateway. The impact of the failure may therefore be evaluated by taking into account either or both of traffic load or system redundancy.

At operation 770, an effect of the failure is evaluated according to the time of day that the failure is detected. In one embodiment, a failure that is identified by the TOD device 540 of FIG. 5 as occurring during peak traffic or business hours may be considered as a catastrophic failure, whereas the same failure that occurs during non-peak hours may be classified at a different, lower level of impact on the IP system 500. A failure that occurs on a stand-alone gateway would typically be considered catastrophic with respect to the endpoints that rely on the stand-alone gateway.

At operation 780, an effect of the failure is evaluated according to a level of traffic identified with the time of day that the failure is detected. In one embodiment, the level of impact or effect of a failure is rated according to a scaled evaluation. A level of impact may be evaluated according to a reduction in traffic flow, for example 10% low, 50% high, and 90% or more reduction being critical or catastrophic. A failure that results in no calls going through or between two networks may be classified as a catastrophic failure. Whereas, a failure that results in a five percent loss in capacity that is resolved in a forty eight hour resolution window may be classified as a low or minor failure.

In one embodiment, traffic flow is evaluated by simulating a failure and determining the impact on the system, on a network, or on the users. Additional gateways or trunks may be simulated to determine their impact on system capacity or traffic flow or service continuity in the event of a failure. A "synthetic" or simulated call may be sent as a test signal over a gateway to determine if there are any performance issues. The simulation may be performed during operation of an IP system or when configuring an IP system.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. An apparatus comprising:
   a database; and
   one or more processors coupled to the database and configured to:
   detect a system fault associated with a call, where the call has an associated dial pattern;
   identify a route list associated with the dial pattern, where the route list identifies a route of transmission of the call to an intended destination;
   identify a gateway from the route list which is associated with the system fault, where the system fault indicates that the call failed to reach the intended destination via the gateway;
   identify a number of dial patterns associated with the gateway including additional dial patterns other than the dial pattern associated with the call;
   rank an impact of the system fault on an Internet Protocol (IP) telephony system or on an external network that is interfaced to the IP telephony system by the gateway, where the rank of the impact of the system fault identifies a reduction in an available traffic load of the IP telephony system, where the available traffic load after the system fault was detected is less than a traffic load before the system fault was detected, and where the rank of the impact of the system fault is determined, at least in part, according to the number of dial patterns associated with the gateway; and
   generate a fault message comprising the dial pattern and a description of the rank of the impact of the system fault, where the description of the rank of the impact is stored on the database, where the fault message further comprises a fault code indicating a type of the system fault.

2. The apparatus according to claim 1 where the number of dial patterns corresponds to a plurality of destination endpoints that utilize the gateway to receive IP data, and where the description of the rank of the impact characterizes the available traffic load differently depending on the number of dial patterns associated with the gateway.

3. The apparatus according to claim 1, where the rank of the impact of the system fault is further determined according to information comprising an identification of a type of service associated with the gateway, and where an interruption of a first type of service is identified in the description of the rank of the impact as being more severe than an interruption of a second type of service.

4. The apparatus according to claim 1 where the rank of the impact of the system fault is further determined, at least in part, according to information comprising a system capacity as measured by a number of gateways, in addition to the gateway, that are included in a trunk of the IP telephony system.

5. The apparatus according to claim 4 including an operation manager inventory that dynamically monitors the number of gateways included in the trunk after the system fault is detected to determine the number of gateways in the trunk that are configured to route the call, where the rank of the impact varies with the number of gateways in the trunk.

6. A method comprising:
   detecting a system failure in an Internet Protocol (IP) telephony system, where the system failure comprises a call that fails to reach an intended destination;
   identifying a gateway that is associated with the call, where the gateway is identified from a dial pattern associated with the call;
   identifying a number of endpoints which utilize one or more IP communication services provided over the gateway;
   classifying an effect of the system failure based, at least in part, on the number of endpoints, where the classification of the effect of the system failure comprises a reduction in an available traffic load of the IP telephony system, and where the available traffic load after the system failure was detected is less than a traffic load before the system failure was detected; and generating a fault message comprising the dial pattern and identifying the classification of the effect of the system failure, where the classification characterizes a severity of the reduction in the available traffic load, where the fault message further identifies one or more geographic locations of one or more end points.

7. The method according to claim 6 including:
determining if the gateway is part of a trunk; and
identifying a number of gateways in the trunk, where the classification of the effect of the system failure is further determined based, at least in part, on the number of gateways included in the trunk, where each of the number of gateways is configured to route the call, and where the severity of the reduction in the available traffic load is characterized differently depending on the number of gateways included in the trunk.

8. The method according to claim 6, where the classification of the effect of the system failure is further determined based on a type of the one or more IP communication services, and where an interruption of a first type of IP communication service is identified by the classification of the effect as being more severe than a different interruption of a second type of IP communication service provided over the gateway.

9. The method according to claim 6 including assigning the classification of the effect of the system failure according to a time of day that the system failure is detected, where a level of traffic is gauged according to a historic level of traffic associated with the time of day that the system failure is detected, and where a higher historic level of traffic is associated with a greater reduction in the available traffic load.

10. The method according to claim 6 including:
identifying outbound and inbound dial peers according to a stored dial peer configuration associated with the gateway, where the number of endpoints is identified, at least in part, from the stored dial peer configuration.

11. The method according to claim 6 where the fault message identifies the endpoints.

12. A system comprising:
means for detecting a system fault associated with a call, where the call has an associated dial pattern;
means for identifying a route list associated with the dial pattern, where the route list identifies a route of transmission of the call to an intended destination;
means for identifying a gateway from the route list which is associated with the system fault, where the system fault indicates that the call failed to reach the intended destination via the gateway;
means for identifying a number of endpoints which utilize one or more communication services associated with the gateway;
means for determining an impact of the system fault, where the impact of the system fault comprises a reduction in an available level of traffic flow, where the available level of traffic flow after the system fault was detected is less than a level of traffic flow before the system fault was detected, and where the impact of the system fault is determined, at least in part, according to the number of endpoints; and
means for generating a fault message comprising the dial pattern and a description characterizing a severity of the impact of the system fault, where the severity of the impact varies depending on a type of the one or more communication services associated with the gateway;
means for identifying a plurality of trunks or trunk groups from the dial pattern; and
means for identifying a number of gateways in the plurality of trunks or trunk groups, where the severity of the impact further varies depending on the number of gateways in the plurality of trunks or trunk groups.

13. The system according to claim 12 where the type of the one or more communication services comprises any of a voice mail or voice over internet protocol (VoIP) communication, and where the voice mail is associated with a lower severity of impact than the VoIP communication.

14. The system according to claim 12 further comprising:
means for identifying a plurality of trunks or trunk groups from the dial pattern; and
means for identifying a number of gateways in the plurality of trunks or trunk groups, where the severity of the impact further varies depending on the number of gateways in the plurality of trunks or trunk groups.

15. The system according to claim 14 including an operation manager inventory which dynamically associates the number of gateways with the plurality of trunks or trunk groups when the system fault is detected.

16. The system according to claim 14 including means for calculating the reduction in the available level of traffic flow according to how many of the number of gateways residing in the plurality of trunks or trunk groups are configured to route the call.

17. The system according to claim 16 where the reduction in the available level of traffic flow is further calculated by determining a time of day when the system fault occurs, and where the available level of traffic flow is estimated based on the time of day.

18. The system according to claim 12, where the description characterizes the severity of the impact of the system fault as a measure of the available level of traffic flow.

* * * * *